(12) United States Patent
Massimiliano et al.

(10) Patent No.: US 8,099,588 B2
(45) Date of Patent: Jan. 17, 2012

(54) METHOD, SYSTEM AND COMPUTER PROGRAM FOR CONFIGURING FIREWALLS

(75) Inventors: Celli Massimiliano, Italy (IT); Antonio Gallo, Rome (IT); Luigi Pichetti, Rome (IT); Marco Secchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 912 days.

(21) Appl. No.: 12/062,897

(22) Filed: Apr. 4, 2008

(65) Prior Publication Data
US 2008/0250473 A1    Oct. 9, 2008

(30) Foreign Application Priority Data
Apr. 5, 2007  (EP) ..................................... 07105691

(51) Int. Cl.
*G06F 9/00*     (2006.01)
(52) U.S. Cl. ................ 713/1; 713/2; 713/191; 717/171; 717/176; 726/11; 726/14
(58) Field of Classification Search ................ 717/171, 717/176; 726/1, 11, 14; 713/167, 191, 1, 713/2; 705/51
See application file for complete search history.

(56) References Cited

U.S. PATENT DOCUMENTS

| | | | |
|---|---|---|---|
| 6,993,760 B2 * | 1/2006 | Peev et al. ...................... | 717/174 |
| 7,716,463 B2 * | 5/2010 | Holladay et al. .................. | 713/2 |
| 2004/0153869 A1 | 8/2004 | Marinelli et al. | |
| 2005/0055692 A1 | 3/2005 | Lupini et al. | |
| 2005/0149925 A1 | 7/2005 | Pichetti et al. | |
| 2005/0262501 A1 | 11/2005 | Marinelli et al. | |
| 2005/0289536 A1 | 12/2005 | Nayak et al. | |
| 2006/0048145 A1 | 3/2006 | Celli et al. | |

FOREIGN PATENT DOCUMENTS

| | | |
|---|---|---|
| EP | 0811942 | 12/1997 |
| EP | 1318452 | 6/2003 |
| EP | 1724678 | 11/2006 |

OTHER PUBLICATIONS

"IBM Tivoli Configuration Manager—User's Guide for Software distribution—Version 4.2 (SC23-411-00)" User's Guide for Software Distribution, IBM, US, Oct. 30, 2002, Page complete, XP002325607.

* cited by examiner

*Primary Examiner* — Eleni Shiferaw
*Assistant Examiner* — Paul Callahan
(74) *Attorney, Agent, or Firm* — Yee & Associates, P.C.; Jeffrey S. LaBaw (57) ABSTRACT

A solution is proposed for distributing a software product to a set of data processing entities (such as endpoints) in a data processing system; the system includes a set of security applications (such as firewalls), which are adapted to control communications of the entities. A corresponding method starts with the step of determining a target configuration of the security applications for allowing execution of the software product on the entities. A software package (or more), being adapted to enforce the software product and the target configuration, is then built. The method continues by distributing the software package in the system, so as to cause the application of the software package for enforcing the software product on each entity and the target configuration of each security application.

17 Claims, 4 Drawing Sheets

"METHOD, SYSTEM AND COMPUTER
PROGRAM FOR CONFIGURING FIREWALLS

FIELD OF THE INVENTION

The present invention relates to the data processing field. More specifically, the present invention relates to the distribution of software products.

BACKGROUND

Distribution of software products is a very time consuming activity, especially in a data processing system including a high number of computers (or endpoints). A typical example is that of a large network with hundreds of endpoints, wherein software products are continually installed, upgraded or removed (for example, to be abreast of the information technology development or to adapt to organizational changes). For this purpose, software distribution applications are commonly used to automate the distribution of the software products from a central site of the system. Typically, a software distribution application controls the building of software packages, each one adapted to enforce the desired condition of a corresponding software product (for example, installed, upgraded or removed). The software package is then distributed to selected endpoints, and it is applied on each one of them so as to install, upgrade or remove the software product. An example of commercial software distribution application available on the market is the "IBM Tivoli Configuration Manager or ITCM" by IBM Corporation.

Security issues have also become very important in the last years. In this respect, the current focus has drifted from a server side to a client side (being the target of many recent attacks by harmful codes or malicious intruders). For this purpose, security applications (such as firewalls) are commonly used to control any communications of the endpoints. Particularly, a firewall may be installed on each endpoint (to control communications with other computers); moreover, a firewall may be installed on a router of a private network (to control communications of each endpoint of the private network with other computers outside it). In both cases, the firewall can protect the endpoints (either individually or as a whole in the private network) from attacks coming from computers that are not trusted.

Therefore, whenever a software product (being distributed to a specific endpoint) requires communicating with other computers, the corresponding firewall must be properly configured before the software product can be used.

For this purpose, one approach that has been proposed is of having an end-user of each endpoint configure his/her firewall manually. However, the end-users generally do not have the skills required to perform this task. Moreover, the end-users may choose different firewall configurations for their endpoints; this may cause conflicts with global security policies (for example, at an enterprise level). In any case, the same operations must be repeated on each endpoint (or router); the time spent for each firewall, multiplied by the number of firewalls of the system, may make the process untenable in very large systems.

Another approach that has been proposed is of having the firewall alert the end-user whenever communications being not authorized are attempted. In this case, the end-user is prompted to decide whether the communications can be allowed or denied (either temporarily or permanently). However, this solution suffers the same drawbacks pointed out above. Indeed, the end-users generally do not understand the meaning of the alerts provided by the firewalls; moreover, the end-users may allow different communications on their endpoints (even in conflict with global security policies). In any case, the process is time consuming (with the alerts that are often annoying for the end-users).

Some solutions have also been proposed for automating the configuration of the firewalls (for example, by means of scripts). However, these solutions are completely stand-alone, without any connection with the above-described software distribution process. In any case, manual operations are always required to define the desired firewall configurations and to prepare the corresponding scripts for their application.

Vice-versa, document US-A-2005/262501 (the entire disclosure of which is herein incorporated by reference to the maximum extend allowed by law) discloses a software distribution application, wherein the software packages may also be used to configure the software products. However, the configuration only relates to the same software products that are distributed with the software packages (or that were distributed previously).

SUMMARY

In its general terms, the present disclosure is based on the idea of distributing the software products with the required configurations of the corresponding security applications.

Particularly, different aspects of the invention provide a solution as set out in the independent claims. Advantageous embodiments of the invention are set out in the dependent claims.

More specifically, an aspect of the invention proposes a method for distributing a software product to a set of data processing entities (such as endpoints) in a data processing system; the system includes a set of security applications (such as firewalls), which are adapted to control communications of the entities. The method starts with the step of determining a target configuration of the security applications for allowing execution of the software product on the entities. A software package (or more), being adapted to enforce the software product and the target configuration, is then built. The method continues by distributing the software package in the system, so as to cause the application of the software package for enforcing the software product on each entity and the target configuration of each security application.

In an embodiment of the invention, a single software package is distributed to each endpoint, wherein it is applied so as to enforce both the software product and the target configuration of a security application being installed thereon.

In addition or in alternative, a single software package is again distributed to each endpoint, wherein it is applied so as to enforce the software product and the target configuration of a security application being installed on one or more bridge units (such as routers) of a corresponding network.

As a further improvement, commands required to enforce the target configuration are determined by comparing two different conditions of a further security application—before and after its configuration for allowing execution of the software product—on a further entity (such as a preparation server).

The same differencing process may also be used to determine further commands and resources, which are required to enforce the software product.

In a different embodiment, the commands for enforcing the target configuration are determined by monitoring the communications of the software product on the further entity.

Preferably, in this case no security application controls the communications of the further entity.

Typically, a differencing process is again used to determine a set of executable modules that are installed on the further entity as a result of the enforcing of the software product, so as to discard the communications being not related to these executable modules.

Another aspect of the invention proposes a computer program for performing the above-described method.

A different aspect of the invention proposes a corresponding system.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
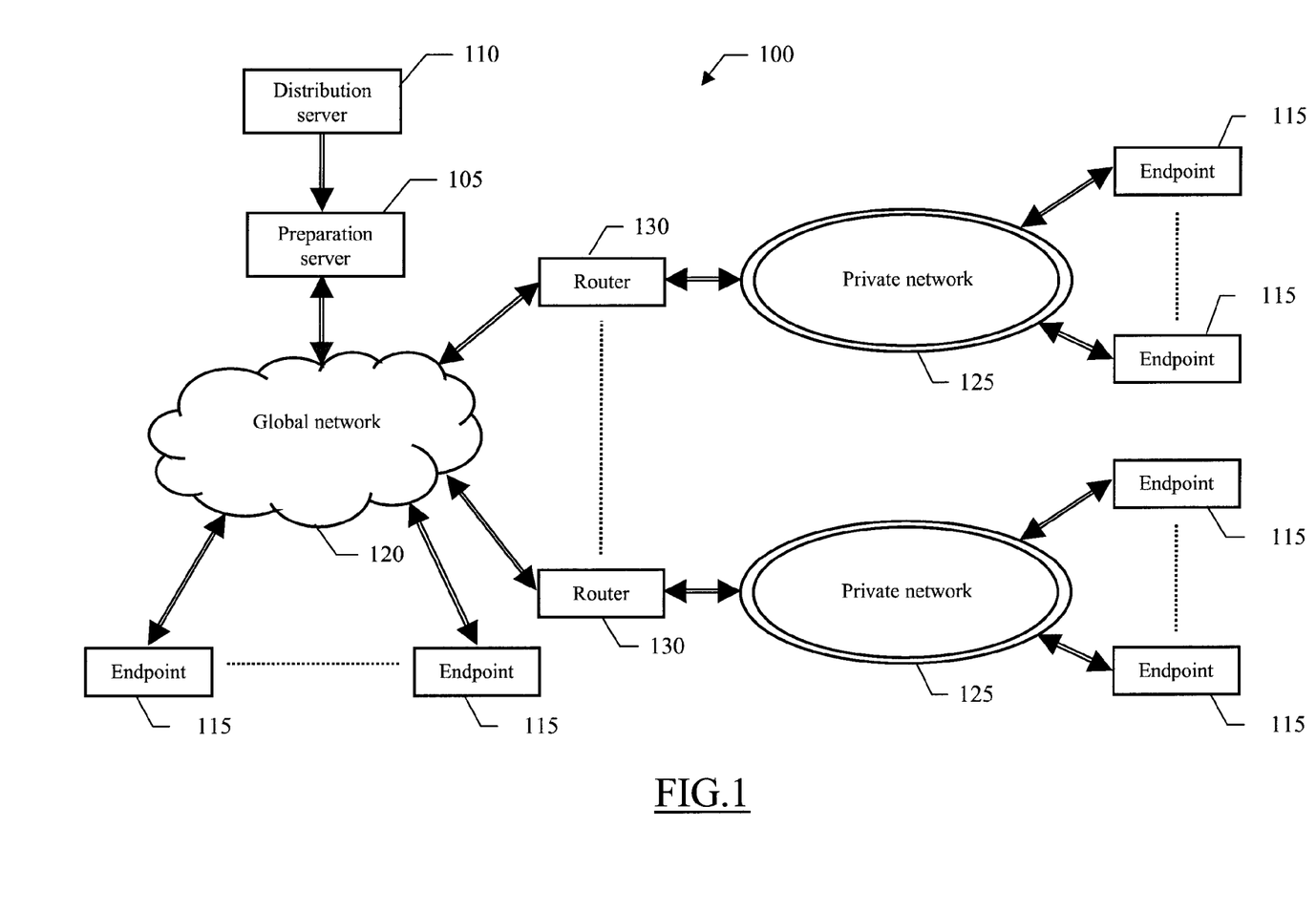
FIG. 1 is a schematic block diagram of a data processing system in which the solution according to an embodiment of the invention is applicable.

With reference in particular to FIG. 1, a data processing system 100 with distributed architecture is illustrated. The system 100 implements a software distribution infrastructure (for example, based on the above-mentioned ITCM).

Particularly, a preparation server 105 operates as a central site for defining, testing and building software packages to be used for enforcing desired conditions of software products in the system 100 (i.e., to install, upgrade, or remove them). When a software product must be installed/upgraded, the corresponding software package embeds an image thereof—consisting of the resources required for installing/upgrading the software product, such as executable modules, libraries, configuration tables, databases, and the like (typically, in the form of compressed files). In any case, the software package includes commands that specify the actions to be executed for enforcing the software product (such as add, delete, or update files, registry entries, and the like).

A distribution server 110 controls the distribution of the software packages from the preparation server 105 (acting as a source host providing the desired software packages) to multiple endpoints 115. For this purpose, the distribution server 110 and the endpoints 115 communicate through a network 120 (for example, a global network based on the Internet). More specifically, the software packages may be deployed to the endpoints 115 in push mode by means of a distribution service (for example, consisting of the "Multiplexed Distribution or MDIST2" service based on the "Tivoli Management Framework or TMF" by IBM Corporation); this result is achieved operating in a disconnected way (wherein a set of software packages is deployed to selected endpoints 115 according to a predefined plan) or in a real-time way (in response to specific requests entered through a command line interface, or CLI). Alternatively, the endpoints 115 may download desired software packages directly from the preparation server 105 in pull mode. In any case, the software packages are then applied on each endpoint 115, so as to enforce the corresponding software products.

The endpoints 115 may consist of stand-alone computers, which communicate with other computers directly. Alternatively, the endpoints 115 may consist of nodes of further networks 125 (for example, private networks based on LANs); in this case, the endpoints 115 of each private network 125 communicate with other computers through a router 130. Particularly, the (stand-alone) endpoints 115 communicate with the distribution server 105 directly, while the (networked) endpoints 115 communicate with the distribution server 105 through the corresponding router 130.

Any communications of each stand-alone endpoint 115 with other computers is controlled by a personal firewall, which is installed on the stand-alone endpoint 115 itself. Likewise, any communications of each networked endpoint 115 with other computers outside its private network 125 is controlled by an external firewall, which is installed on the corresponding router 130 (while communications among the endpoints 115 of the same private network 125 are generally subject to no restrictions).

Generally, a (personal/external) firewall is a software application that separates two environments with different levels of security. Particularly, the firewall implements a predefined connection policy between the two environments. For example, the firewall may specify which software programs of the more secure environment are authorized to initiate a communication session with other computers of the less secure environment, and which software programs of the more secure environment are authorized to listen for requests coming from other computers of the less secure environment (being then allowed to initiate a communication session with the more secure environment). In this way, the firewall can protect the more secure environment from attacks coming from the less secure environment.

Figure 2:
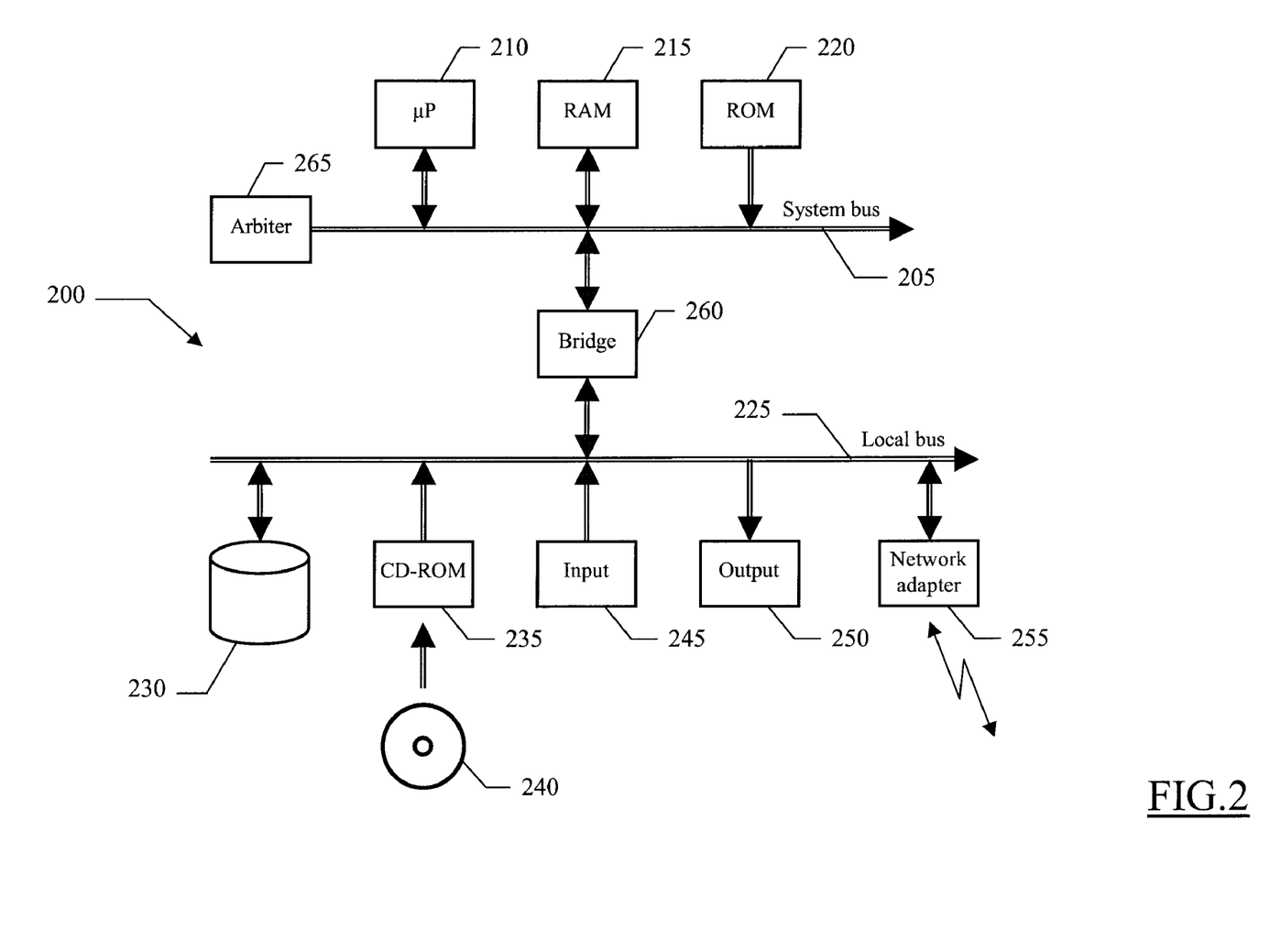
FIG. 2 shows the functional blocks of an exemplary computer of the system.

Moving now to FIG. 2, a generic computer of the above-described system (i.e., preparation server, distribution server, endpoint, or router) is denoted with 200. The computer 200 is formed by several units that are connected in parallel to a system bus 205 (with a structure that is suitably scaled according to the actual function of the computer 200 in the system). In detail, one or more microprocessors (μP) 210 control operation of the computer 200; a RAM 215 is directly used as a working memory by the microprocessors 210, and a ROM 220 stores basic code for a bootstrap of the computer 200. Several peripheral units are clustered around a local bus 225 (by means of respective interfaces). Particularly, a mass memory consists of one or more hard-disks 230 and drives 235 for reading CD-ROMs 240. Moreover, the computer 200 includes input units 245 (for example, a keyboard and a mouse), and output units 250 (for example, a monitor and a printer). A network adapter 255 is used to plug the computer 200 into the system. A bridge unit 260 interfaces the system bus 205 with the local bus 225. Each microprocessor 210 and the bridge unit 260 can operate as master agents requesting an access to the system bus 205 for transmitting information. An arbiter 265 manages the granting of the access with mutual exclusion to the system bus 205.

In the solution according to an embodiment of the present invention, as described in detail in the following, the software products are distributed with the required configurations of the firewalls (for example, defined by additional commands in the same software packages).

In this way, each firewall is automatically configured without requiring any intervention of a corresponding end-user. It is then possible to choose the same configuration for a number of firewalls; this prevents any risk of conflicts with global security policies. In any case, the proposed solution is very simple and time effective. Moreover, it is also possible to avoid any annoying alerts for the end-users (being provided by the firewalls when the distributed software products are not authorized to carry out specific communications).

Figure 3:
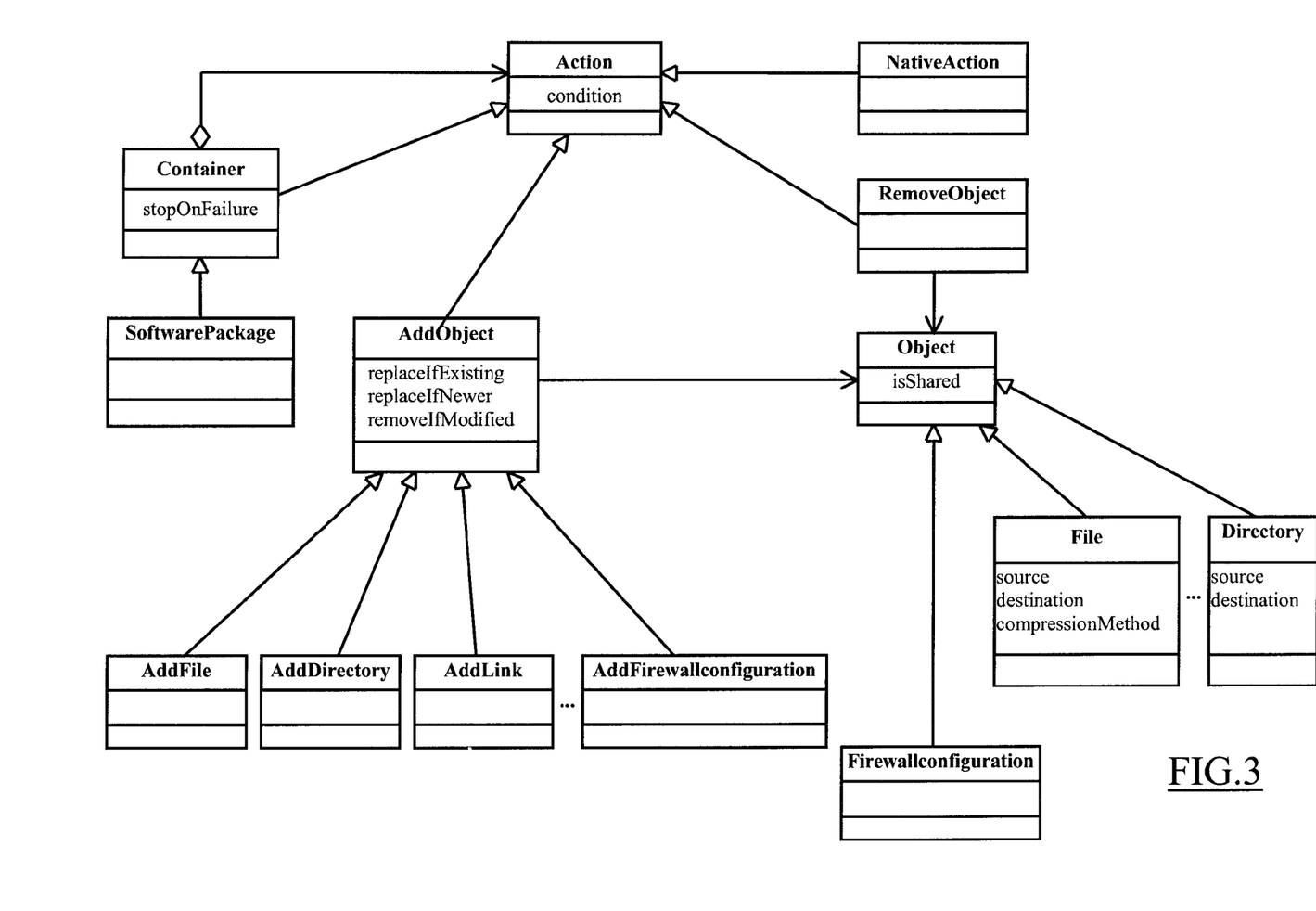
FIG. 3 is a class diagram modeling a software package according to an embodiment of the invention.

Moving to FIG. 3, the structure of a software package that may be used to implement the solution according to an embodiment of the present invention is modeled with a corresponding class diagram. The class diagram provides a static representation of the structure by means of its classes and their interactions; each class represents an entity of the structure that encapsulates certain attributes (defining its properties) and methods (exposing functions available to other classes)—as indicated by a rectangle being split into three frames for its name, attributes, and methods, respectively.

Particularly, a generic software package instantiates a corresponding class "SoftwarePackage". The class "SoftwarePackage" extends a class "Container"—as indicated by a corresponding relationship, represented with an arrow with an unfilled triangular tip, meaning that the (source) class "SoftwarePackage" inheritances the functionality of the (target) class "Container". The class "Container" is formed by one or more classes "Action"—as indicated by a corresponding aggregation, represented by an arrow starting with an unfilled diamond, meaning that the (source) class "Container" has the (target) class "Action".

The class "Action" defines a corresponding action to be executed on the endpoints; the class "Action" exposes a series of attributes (denoted as a whole with "condition"), which attributes specify the conditions to be satisfied for allowing execution of the action; for example, the action may be conditioned on hardware and/or software parameters of the endpoints (such as their working memory capacity, their operating system, and the like). The class "Container" defines a collection of actions sharing a default behavior. The class "Container" also extends the class "Action", by adding a further attribute ("StopOnFailure"), which enables the result of an action to condition the execution of any actions depending thereon in the collection.

The class "Action" directly implements self-contained actions directly supported by the software distribution application (for example, specifying the restarting of the endpoints). The class "Action" is also extended by other classes that define specific types of actions.

Particularly, a class "NativeAction" implements a native action, which is specific for the endpoints and not based on the software distribution application. Another class "AddObject" is used to add an installable object to the endpoints. The class "AddObject" exposes a series of attributes, which are used to control a version of the corresponding object; particularly, an attribute "replaceIfExisting" specifies that a pre-existing object may be replaced, an attribute "replaceIfNewer" specifies that only an older version of the object may be replaced, and an attribute "removeIfModified" specifies that a pre-existing object must be removed when modified. The class "AddObject" is in turn extended by different classes for specific types of objects to be added; for example, a class "AddFile", a class "AddDirectory" and a class "AddLink" are used to copy a file on the endpoints, to create a directory in the corresponding file system, and to provide a link on their desktop, respectively. On the contrary, a class "RemoveObject" (extending the class "Action") is used to remove a corresponding object from the endpoints.

Both the class "AddObject" and the class "RemoveObject" are related to a class "Object"—as indicated by a corresponding association, represented by an arrow ending with an open tip, meaning that the (source) classes "AddObject" and "RemoveObject" know the (target) class "Object". The class "Object" corresponds to the object to be added or removed; the class "Object" exposes an attribute "isShared", which indicates whether the object can be shared among multiple software packages. The class "Object" is in turn extended by different classes for specific types of objects. For example, a class "File" (for a file to be copied or deleted) specifies an attribute "source" (indicating where the file is available), an attribute "destination" (indicating where the file must be copied), and an attribute "compressionMethod" (indicating how the file is compressed); another example is a class "Directory" (for a directory to be created or destroyed), which specifies an attribute "source" (indicating where the directory is available) and an attribute "destination" (indicating where the directory must be created).

In the solution according to an embodiment of the present invention, the above-described structure of the software package is extended with additional classes adapted to implement the distribution of the firewall configurations. Particularly, a class "AddFirewallConfiguration" extends the class "AddObject" for implementing the actions required to configure the firewalls. Another class "FirewallConfiguration" extends the class "Object" for implementing the configurations to be applied to the firewalls.

Typically, the firewall configurations are defined in corresponding profiles. For example, the configurations of the firewalls may involve the addition of access permissions (for a software product initiating a communication session with another computer directly); typically, each access permission specifies when the communications are required (date and time), the name of a software program that attempts to initiate the communication session, the destination IP address of a computer that the software program tries to contact, whether the permission is required for a trusted zone, the Internet or both of them, whether the communications are allowed, denied or left to the decision of the end-user, and in the latter case whether the decision must be remembered or not for next requests.

The configurations of the firewalls may also involve the addition of advanced access permissions (for a software product initiating a communication session with another computer indirectly); typically, each advanced access permission specifies when the communications are required (date and time), the name of a software program that attempts using another (bridge) software program to initiate the communication session, the bridge software program actually initiating the communication session, the destination IP address of a computer that the bridge software program tries to contact, whether the permission is required for a trusted zone, the Internet or both of them, whether the communications are allowed, denied or left to the decision of the end-user, and in the latter case whether the decision must be remembered or not for next requests.

Moreover, the configurations of the firewalls may involve the addition of incoming permissions (for a software product listening for requests from other computers initiating a communication session with the software product); typically, each incoming permission specifies when the communications are required (date and time), the source IP address and port number of a computer that attempts initiating the communication session, the destination IP address and port number of a computer to be contacted in response thereto, and the type of protocol that can be used for the communications.

An example of textual definition of the commands for configuring the firewalls (for allowing execution of a corresponding software product) is:
package

```
....
Add_firewall_configuration
    .....
    configuration
        access_permission
            application_name = myApplication
            destination_ip = myDestination1
            zone_type = trusted
            action = allow
        end
        advanced_access_permission
            application_name = myApplication
            bridge_application_name = myBridge
            destination_ip = myDestination2
            zone_type = trusted
            action = allow
        end
        incoming_permission
            source_ip = mySourceIp
            source_port = mySourcePort
            destination_ip = myDestinationIp
            destination_port = myDestinationPort
            protocol = myProtocol
        end
    end
end
```

In this case, the software package is used to configure the firewalls to authorize the software program "myApplication" to initiate a communication session with the computer at the IP address "myDestination1", and to initiate a communication session through the bridge software program "myBridge" with the computer at the IP address "myDestination2" (both of them in the trusted zone); moreover, the firewall is configured to authorize a communication session, initiated by the computer at the IP address "mySourceIp" on the port "mySourcePort", for the computer at the IP address "myDestinationIp" on the port "myDestinationPort" using the protocol "myProtocol".

Figure 4:
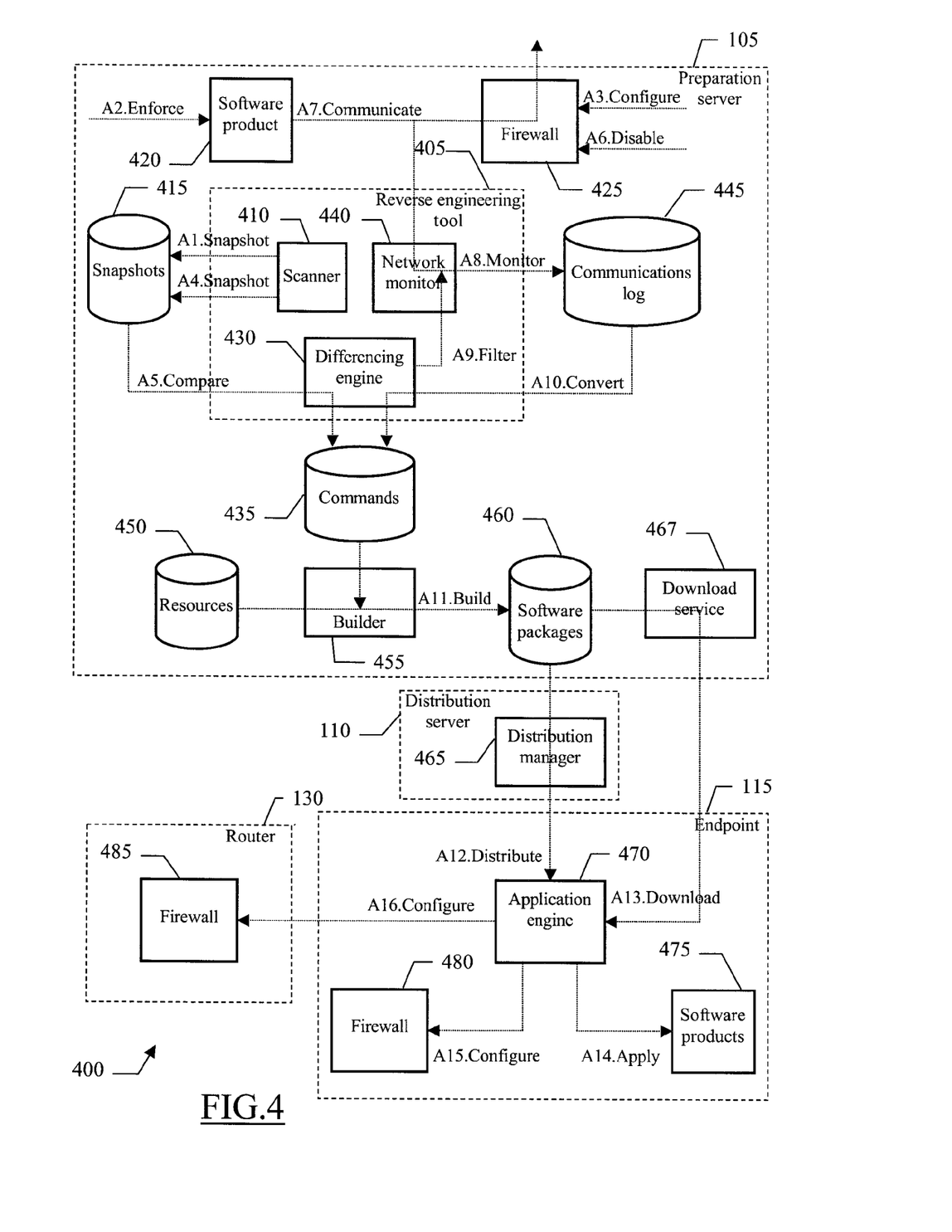
FIG. 4 is a collaboration diagram representing the roles of different components that may be used to implement the solution according to an embodiment of the invention.

Considering now FIG. 4, a collaboration diagram 400 representing the roles of different components that may be used to implement the solution according to an embodiment of the invention is illustrated. The figure describes the static structure of the system (by means of the corresponding components) and its dynamic behavior (by means of a series of exchanged messages, each one representing a corresponding action, denoted with sequence numbers preceded by the symbol "A").

Particularly, the preparation server 105 includes a reverse engineering tool 405 (for example, based on the "AutoPack" service of the "ITCM"); the reverse engineering tool 405 is commonly used to detect changes on the preparation server 105 and then automatically build software packages including commands required to reproduce these changes. For this purpose, the reverse engineering tool 405 has a scanner 410; the scanner 410 is used to take an initial snapshot of the preparation server 105, which initial snapshot is then saved into a corresponding repository 415 (action "A1.Snapshot"). Generally, the initial snapshot includes an indication of files, directories, registry entries, available services, and the like; in this case, the initial snapshot is extended with an indication of firewall configurations (for example, their profiles). A (reference) software product 420 to be distributed is enforced on the preparation server 105 to the same condition as desired on the endpoints (action "A2.Enforce"). A (reference) firewall 425 installed on the preparation server 105 is then configured manually so as to allow execution of the reference software product 420 (action "A3.Configure"). At this point, the scanner 410 takes an ending snapshot of the preparation server 105, which ending snapshot is again saved into the repository 415 (action "A4.Snapshot"). A differencing engine 430 of the reverse engineering tool 405 compares the ending snapshot and the initial snapshot (extracted from the repository 415), so as to determine the actions to be executed for passing from the condition of the initial snapshot to the condition of the ending snapshot; the differencing engine 430 then defines the commands required for executing these actions, which commands are saved into a corresponding repository 435 (action "A5.Compare"). Particularly, some of the commands are used to enforce the reference software product 420, while other commands are used to configure the reference firewall 425; for this purpose, the differencing engine 430 is provided with a specific add-on (not shown in the figure) being adapted to compare different firewall configurations.

In this way, the commands required to configure the firewalls are obtained automatically. This involves the configuration of a single reference firewall 425 on the preparation server 105; therefore, the operation may be performed by an operator properly skilled. In any case, once the reference firewall 425 has been correctly configured, its configuration can be replicated automatically without any risk of errors.

Alternatively, it is possible to disable the reference firewall 425 (action "A6.Disable"). The reference software product 420 (once enforced on the preparation server 105) is then executed continuously in test mode, so as to exercise most of its functions. In this phase, the reference software product 420 typically communicates with other computers (action "A7.Communicate"); the communications are always allowed (since the reference firewall 425 is disabled), so as to avoid any execution error of the reference software product 420. At the same time, however, a network monitor 440 (consisting of another add-on of the reverse engineering tool 405) monitors the communications of the preparation server 105 with the other computers; the communications so detected are then saved into a corresponding log (action "A8.Monitor"). For example, the network monitor 440 may consist of a sniffer, which intercepts all the communications of the preparation server 105.

Preferably, the network monitor 440 filters the detected communications, so as to discard the ones that are not relevant to the execution of the reference software product 420. The desired result may be achieved automatically by means of a differencing process similar to the one described above (denoted with the same sequence numbers for the sake of simplicity). Particularly, the scanner 410 again takes an initial snapshot of the preparation server 105 (action "A1.Snapshot"). The reference software product 420 is then enforced on the preparation server 105 (action "A2.Enforce"); however, in this case no action is performed to configure the reference firewall 425. The scanner 410 now takes an ending snapshot of the preparation server 105 (action "A4.Snapshot"). The differencing engine 430 again compares the ending snapshot and the initial snapshot (from the repository 415), so as to determine the commands required for enforcing the reference software product 420 (action "A5.Compare"); the same operation also provides an indication of any executable modules of the reference software product 420 that have been added to the preparation server 105 as a result of its enforcing. This information is passed to the network monitor 440, which then registers only the communications relating to processes created by the above-mentioned executable modules of the reference software application 420.

The differencing engine 430 analyzes the communications extracted from the log 445, so as to determine the actions to be executed for configuring the firewalls in such a way to authorize them; the differencing engine 430 then defines the commands required for executing these actions, which commands are again saved into the repository 435 (action "A10.Convert"); for this purpose, the differencing engine 430 is provided with a further add-on (not shown in the figure) being adapted to convert the logged communications into the corresponding commands for configuring the firewalls.

In this way, the commands required to configure the firewalls are obtained in a completely automatic way, without any manual intervention. Anyway, assuming that the reference software product 420 has been properly exercised, the obtained results provide an acceptable level of accuracy in many practical situations.

The resources available for distributing any software products are stored in another repository 450. A builder 455 extracts the definition of the commands for enforcing the desired software product and its firewall configuration from the repository 435, and loads the corresponding resources (for installing/upgrading the software product) from the repository 450. The builder 455 then creates the software package to be distributed by embedding the required resources and adding the corresponding commands; the software package so obtained is stored into a repository 460 (action "A11.Build"). The same process may be repeated for any other software product to be distributed (together with the corresponding firewall configuration).

Moving now to the distribution server 110, a distribution manager 465 generates distribution plans (each one consisting of a list of activities specifying the application of specific software packages on selected endpoints 115). The plans may be created in the disconnected way by a dedicated service (such as the "Change Manager or CM" of the "ITCM"), according to predefined reference models specifying a desired configuration of each endpoint subscribing to the reference model (identified according to a role thereof); alternatively, the plans may be created in the run-time way (in response to command line requests), so as to distribute selected software packages manually to a set of endpoints 115 at a time. In any case, the distribution manager 465 submits the execution of each plan by means of a corresponding service (such as the "Activity Planner Manager or APM" of the "ITCM"), which controls the execution of the corresponding activities; as a result, each software package specified in the plan is extracted from its repository 460 and then distributed to the desired endpoints 115 (action "A12.Distribute"). Alternatively, the preparation server 105 exposes a downloading service 467; authorized endpoints 115 can access the downloading service 467, so as to select the desired software packages that are then downloaded thereto (action "A13.Download").

A generic endpoint 115 of the system includes an application engine 470 (such as the "Software Installation Engine or SIE" service of the "ITCM"). The application engine 470 enforces the application of each received software package on the endpoint 115 (action "A14.Apply"). This involves the execution of the commands specified in the software package, which commands are required to reach the desired condition (i.e., installed, upgraded or removed) of the corresponding software product. As a result, the software product (generically denoted with 475 in the figure) is installed, upgraded or removed on the endpoint 115. At the same time, the application of the same software package involves the execution of the commands, which are required to configure a personal firewall 480 installed on the endpoint 115 for allowing execution of the software product 475 (action "A15.Configure"). For this purpose, the application engine 470 is provided with an add-on (not shown in the figure) being adapted to interact with the personal firewall 480.

In addition or in alternative, the application of the software package may involve the execution of other commands, which are required to configure an external firewall 485 installed on the corresponding router 130, always for allowing execution of the software product 475 (action "A16.Configure"). In this case, the application engine 470 is provided with another add-on (not shown in the figure) for interacting remotely with the external firewall 485; for example, the application engine 470 communicates with the router 130 through a predefined URL (typically, "http://192.168.1.1") or a secured service (providing the credentials required to connect to the router 130 with the authority of updating the configuration of the external firewall 485).

It should be noted that the desired result may be achieved by properly adapting the functionality of the software distribution application, which is already available to configure the same software products that are distributed—as described in the above-mentioned document US-A-2005/262501; particularly, it is necessary to extend the functionality described in this document to allow the configuration of the corresponding firewalls (either locally on the same endpoints or remotely on their routers) together with the distribution of the desired software products.

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution lends itself to be implemented with an equivalent method (by using similar steps, removing some steps being non-essential, or adding further optional steps); moreover, the steps may be performed in a different order, concurrently or in an interleaved way (at least in part).

The software distribution infrastructure described above must not be interpreted in a limitative manner. For example, similar considerations apply if the preparation server and the distribution server are combined into a single computer, or if the software packages have an equivalent structure (such as of the multi-segment type); moreover, the software packages may be built dynamically when they are to be distributed, or the distribution of the software packages may be controlled in any other way (for example, only in the push mode or in the pull mode).

Although the proposed solution finds its typical application when the software products (in the broadest meaning of the term) are installed for the first time, nothing prevents applying the same method also when the software products are upgraded, removed, configured, or more generally enforced on the endpoints. Moreover, even if in the preceding description reference has been made to firewalls, this is not to be interpreted in a limitative manner (with the same solution that may also be applied to whatever security applications adapted to control communications of the endpoints); likewise, the above-described types of permissions that may be defined in the firewall profiles are not comprehensive—with the firewalls that may be configured in any other way to control whatever communications of the corresponding endpoint(s).

The distribution of multiple software packages to the same endpoints is not excluded (for example, with a software package for enforcing the software product and another software package for enforcing the corresponding firewall configuration). Moreover, it is possible to have different firewall configurations for groups of endpoints (for the same software product being distributed); in this case, the corresponding different commands may be provided either in a single software package (being conditioned on the endpoint type) or in distinct software packages.

Without departing from the principles of the solution, the external firewalls may be installed on gateways, switches, or more generally on any equivalent bridge unit (or more) of a generic network—being used by the corresponding endpoints to communicate with the outside of the network. In this case as well, the possibility of providing distinct software packages for enforcing the software product on the endpoints and the corresponding firewall configuration on the routers is not excluded.

In any case, the proposed solution may be implemented by configuring the personal firewalls only, the external firewalls only, or both of them at the same time.

Similar considerations apply if equivalent tools are used to determine the commands required to bring the reference firewall from its initial condition to its ending condition (separated by the configuration of the reference firewall for allowing execution of the reference software product). Moreover, nothing prevents applying this process to the configuration of the reference firewall only—even without enforcing the reference software product on the preparation server (with the initial and ending snapshots of the preparation server that may be limited to the profile of the reference firewall); for example, the software package for enforcing the desired software product may be defined in any other way (even manually), and then completed with the addition of the commands required for enforcing the corresponding firewall configuration.

Similar considerations apply if the communications of the reference software product are monitored in any other way (for example, by means of hooking techniques), or if the corresponding commands for configuring the firewalls are determined with equivalent procedures.

Of course, in this case the reference firewall may be missing at all on the preparation server; alternatively, it is possible to provide a wrapper for the reference firewall—which wrapper enables all the communications but logs the ones that would have not been allowed (for their next analysis by the differencing engine).

Moreover, nothing prevents using different techniques for determining the processes (associated with the executable modules of the reference software product) to be used for filtering the communications of the preparation server; for example, the required information may be extracted from a signature of the reference software product, or even entered manually. In any case, this feature is not strictly necessary and it may be omitted in a simplified implementation.

Naturally, it is possible to apply the proposed techniques for automating the definition of the firewall configurations on any other computer (for example, a dummy endpoint of the system). Anyway, the manual definition of the commands for enforcing the desired firewall configurations is within the scope of the solution.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to the present invention lends itself to be implemented with an application having a different architecture (for example, working on a single server), with a hardware structure (for example, integrated in a chip of semiconductor material), or with a combination of software and hardware.

The proposed method may also be carried out on a system having a different topology or including equivalent units (for example, based on a local network). Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like), or with a combination thereof (such as a client/server architecture, a grid computing infrastructure, and the like).

The invention claimed is:

1. A method for building a software package, the method comprising the steps of:
   detecting a starting condition of a preparation server device that includes a reference firewall used to control communications of a software product installed on the preparation server device with other devices via a network;
   configuring the reference firewall at the preparation server device to allow communication of the software product installed on the preparation server device with the other devices via the network;
   detecting an ending condition of the preparation server device after the reference firewall is configured to allow the communication of the software product with the other devices via the network;
   determining, by the preparation server device, a set of commands to be executed for bringing the reference firewall from a configuration associated with the starting condition of the preparation server device to a configuration associated with the ending condition of the preparation server device based on a comparison between the starting condition and the ending condition;
   determining, by the preparation server device, a target configuration of a set of firewalls used to control communications between a set of data processing devices in a distributed data processing system to allow communication of the software product with the set of data processing devices via a set of networks based on the reference firewall; and building, by the preparation server device, at least one software package to be distributed to each device in the set of data processing devices to enforce a condition of the software product on each device in the set of data processing devices and the target configuration of each firewall in the set of firewalls by adding the set of commands to the at least one software package.

2. The method according to claim 1, wherein a firewall from the set of firewalls is installed on each device in the set of data processing devices, the step of building the at least one software package includes:

building a single software package used to enforce the condition of the software product and the target configuration of the set of firewalls on the set of data processing devices, wherein the single software package is distributed to each device in the set of data processing devices to cause application of the software package on each device for enforcing the condition of the software product on each device and the target configuration of the firewall installed on each device.

3. The method according to claim 1, wherein at least a subset of the set of data processing devices are coupled to a network in the set of networks, each network in the set of networks including at least one bridge unit, a subset of data processing devices of a corresponding network communicating with devices outside of the corresponding network through the at least one bridge unit, and wherein a firewall from the set of firewalls is installed on each bridge unit for controlling communications of each subset of data processing devices of each corresponding network, the step of building the at least one software package includes:

building a single software package used to enforce the condition of the software product on the set of data processing devices and the target configuration of the firewall installed on each bridge unit, wherein the single software package is distributed to each device in the set of data processing devices to cause application of the software package on each device for enforcing the software product on each device and the target configuration of the firewall installed on a corresponding bridge unit.

4. The method according to claim 1, wherein the step of determining the target configuration includes:

enforcing the software product installed on the preparation server device between the detecting of the starting condition and the detecting of the ending condition; and determining a set of further commands to be executed for enforcing the software product on the preparation server device according to the comparison between the starting condition and the ending condition;

and wherein the step of building the at least one software package includes:

adding an indication of the set of further commands and each resource required for execution of the set of further commands to the at least one software package.

5. The method according to claim 1, wherein the step of determining the target configuration includes:

monitoring the communications of the software product installed on the preparation server device with the other devices connected to the network; and determining another set of commands for configuring the set of firewalls to enable the monitored communications;

and wherein the step of building the at least one software package includes:

adding an indication of the another set of commands to the at least one software package.

6. The method according to claim 5, wherein the step of monitoring the communications of the software product installed on the preparation server device with the other devices connected to the network includes:

monitoring the communications of the software product with the other devices with no firewall controlling the communications of the software product installed on the preparation server device.

7. The method according to claim 5, further including the steps of:

detecting a starting condition of the preparation server device;

enforcing the software product on the preparation server device;

detecting an ending condition of the preparation server device; and determining a set of executable modules being installed on the preparation server device as a result of the enforcing of the software product based on a comparison between the starting condition and the ending condition, wherein the step of monitoring the communications of the software product installed on the preparation server device with the other devices connected to the network includes:

discarding the communications of the software product not related to the set of executable modules.

8. A computer program stored on a non-transitory computer usable medium for building a software package when the computer program is executed on a data processing system to perform a method, wherein the method includes the steps of:

detecting a starting condition of a preparation server device that includes a reference firewall used to control communications of a software product installed on the preparation server device with other devices via a network;

configuring the reference firewall at the preparation server device to allow communication of the software product installed on the preparation server device with the other devices via the network;

detecting an ending condition of the preparation server device after the reference firewall is configured to allow the communication of the software product with the other devices via the network;

determining a set of commands to be executed for bringing the reference firewall from a configuration associated with the starting condition of the preparation server device to a configuration associated with the ending condition of the preparation server device based on a comparison between the starting condition and the ending condition;

determining a target configuration of a set of firewalls used to control communications between a set of data processing devices in a distributed data processing system to allow communication of the software product with the set of data processing devices via a set of networks based on the reference firewall; and building at least one software package to be distributed to each device in the set of data processing devices to enforce a condition of the software product on each device in the set of data processing devices and the target configuration of each firewall in the set of firewalls by adding the set of commands to the at least one software package.

9. The computer program according to claim 8, wherein a firewall from the set of firewalls is installed on each device in the set of data processing devices, the building of the at least one software package includes:
building a single software package used to enforce the condition of the software product and the target configuration of the set of firewalls on the set of data processing devices, wherein the single software package is distributed to each device in the set of data processing devices to cause application of the software package on each device for enforcing the condition of the software product on each device and the target configuration of the firewall installed on each device.

10. The computer program according to claim 8, wherein at least a subset of the set of data processing devices are coupled to a network in the set of networks, each network in the set of networks including at least one bridge unit, a subset of data processing devices of a corresponding network communicating with devices outside of the corresponding network through the at least one bridge unit, and wherein a firewall from the set of firewalls is installed on each bridge unit for controlling communications of each subset of data processing devices of each corresponding network, the building of the at least one software package includes:
building a single software package used to enforce the condition of the software product on the set of data processing devices and the target configuration of the firewall installed on each bridge unit, wherein the single software package is distributed to each device in the set of data processing devices to cause application of the software package on each device for enforcing the software product on each device and the target configuration of the firewall installed on a corresponding bridge unit.

11. The computer program according to claim 8, wherein the determining of the target configuration includes:
enforcing the software product installed on the preparation server device between the detecting of the starting condition and the detecting of the ending condition; and
determining a set of further commands to be executed for enforcing the software product on the preparation server device according to the comparison between the starting condition and the ending condition;
and wherein the building of the at least one software package includes:
adding an indication of the set of further commands and each resource required for execution of the set of further commands to the at least one software package.

12. The computer program according to claim 8, wherein the determining of the target configuration includes:
monitoring the communications of the software product installed on the preparation server device with the other devices connected to the network; and
determining another set of commands for configuring the set of firewalls to enable the monitored communications;
and wherein the building of the at least one software package includes:
adding an indication of the another set of commands to the at least one software package.

13. The computer program according to claim 12, wherein the monitoring of the communications of the software product installed on the preparation server device with the other devices connected to the network includes:
monitoring the communications of the software product with the other devices with no firewall controlling the communications of the software product installed on the preparation server device.

14. The computer program according to claim 12, wherein the method further includes the steps of:
detecting a starting condition of the preparation server device;
enforcing the software product on the preparation server device;
detecting an ending condition of the preparation server device; and
determining a set of executable modules being installed on the preparation server device as a result of the enforcing of the software product based on a comparison between the starting condition and the ending condition,
wherein the step of monitoring the communications of the software product installed on the preparation server device with the other devices connected to the network includes:
discarding the communications of the software product not related to the set of executable modules.

15. A data processing system for building a software package, the data processing system comprising:
a bus system;
a storage device connected to the bus system, wherein the storage device stores a computer program; and
a processing unit connected to the bus system, wherein the processing unit executes the computer program to:
detect a starting condition of a preparation server device that includes a reference firewall used to control communications of a software product installed on the preparation server device with other devices via a network;
configure the reference firewall at the preparation server device to allow communication of the software product installed on the preparation server device with the other devices via the network;
detect an ending condition of the preparation server device after the reference firewall is configured to allow the communication of the software product with the other devices via the network;
determine a set of commands to be executed for bringing the reference firewall from a configuration associated with the starting condition of the preparation server device to a configuration associated with the ending condition of the preparation server device based on a comparison between the starting condition and the ending condition;
determine a target configuration of a set of firewalls used to control communications between a set of data processing devices in a distributed data processing system to allow communication of the software product with the set of data processing devices via a set of networks based on the reference firewall; and
build at least one software package to be distributed to each device in the set of data processing devices to enforce a condition of the software product on each device in the set of data processing devices and the target configuration of each firewall in the set of firewalls by adding the set of commands to the at least one software package.

16. The data processing system according to claim 15, wherein a firewall from the set of firewalls is installed on each device in the set of data processing devices, and wherein building the at least one software package includes:
building a single software package used to enforce the condition of the software product and the target configuration of the set of firewalls on the set of data processing devices, wherein the single software package is distributed to each device in the set of data processing devices to cause application of the software package on each device for enforcing the condition of the software product on each device and the target configuration of the firewall installed on each device.

17. The data processing system according to claim 15, wherein at least a subset of the set of data processing devices are coupled to a network in the set of networks, each network in the set of networks including at least one bridge unit, a subset of data processing devices of a corresponding network communicating with devices outside of the corresponding network through the at least one bridge unit, and wherein a firewall from the set of firewalls is installed on each bridge unit for controlling communications of each subset of data processing devices of each corresponding network, and wherein building the at least one software package includes:

building a single software package used to enforce the condition of the software product on the set of data processing devices and the target configuration of the firewall installed on each bridge unit, wherein the single software package is distributed to each device in the set of data processing devices to cause application of the software package on each device for enforcing the software product on each device and the target configuration of the firewall installed on a corresponding bridge unit.

* * * * *